(No Model.)

R. S. PEARSALL.
SHEARS.

No. 430,677. Patented June 24, 1890.

Witnesses:
C. Herbert Burns
Edwin C. Cloyd

Richard S. Pearsall
Inventor

UNITED STATES PATENT OFFICE.

RICHARD S. PEARSALL, OF SEA CLIFF, NEW YORK.

SHEARS.

SPECIFICATION forming part of Letters Patent No. 430,677, dated June 24, 1890.

Application filed June 14, 1889. Serial No. 314,205. (No model.)

*To all whom it may concern:*

Be it known that I, RICHARD S. PEARSALL, of Sea Cliff, in the county of Queens and State of New York, have invented a new and useful Improvement in Shears, of which the following is a specification, reference being had to the accompanying drawings, and to the letters of reference marked thereon.

The object and nature of my invention will be fully set forth in the following specification and claim.

Figure 1:
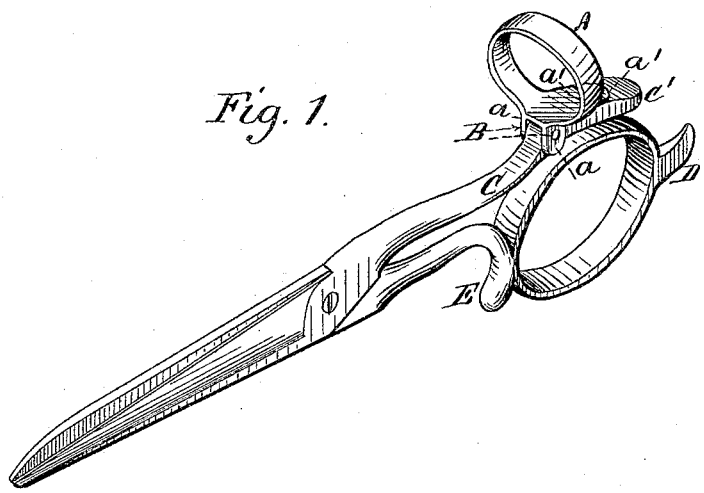
Figure 2:
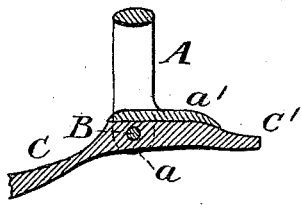

In the drawings, Figure 1 is a perspective view of a pair of shears embodying my improvement, and Fig. 2 is a sectional view of a portion of the upper handle and the ring.

Similar letters of reference indicate similar parts in both figures.

A is a ring hinged to the upper handle C of the shears by means of a pin B, which passes through lugs $a$ $a$ on the ring and the handle C. The handle C extends rearwardly from the hinge, and is widened, as shown at C'. The lower part of the ring A is widened or enlarged, as shown at $a'$, said enlargement extending rearwardly from the lugs $a$ and adapted to rest on the widened portion C' of the handle. The ring is thus hinged at its forward edge to the handle, and when the blades are being closed in the operation of cutting the pressure of the thumb on the rearward extension $a'$ of the ring will cause it to bear with increasing force on the enlarged portion C' of the handle as the shears are gradually closed, thus causing greater leverage when it is most needed—viz., when the forward ends of the blades are making the cut.

D and E are knobs or extensions on the lower handle to assist the hand in firmly grasping the shears.

By hinging the ring to the upper handle of the shears, as shown, the thumb of the operator is on a line nearly parallel or continuous with the line of the cut, and he is enabled to make the cut in a straight or curved line without any constriction or cramping of the hand or wrist, as is the case in using ordinary shears.

I am aware that it is not new to hinge a thimble on the upper handle of a pair of shears; but heretofore, so far as I am aware, such thimble has been hinged at its rear end to the handle, and the effect is that the leverage is decreased, instead of being increased, toward the end of the cut.

Having described my invention, I claim—

As an improvement in shears, the combination, with the upper handle having a widened portion at its rear end, of a ring hinged to said handle forward of the widened portion, and having an enlarged portion extending rearwardly from the hinging-point and adapted to bear on the widened part of the handle, substantially as set forth.

RICHARD S. PEARSALL.

Witnesses:
C. HERBERT BURNS,
EDWIN C. CLOYD.